Nov. 15, 1966 — L. NEWTON — 3,286,063
COMBINATION THERMOSTAT AND TIMER CONTROL
Filed March 2, 1964 — 3 Sheets-Sheet 1

INVENTOR.
LEROY NEWTON
BY Lyon & Lyon
ATTORNEYS

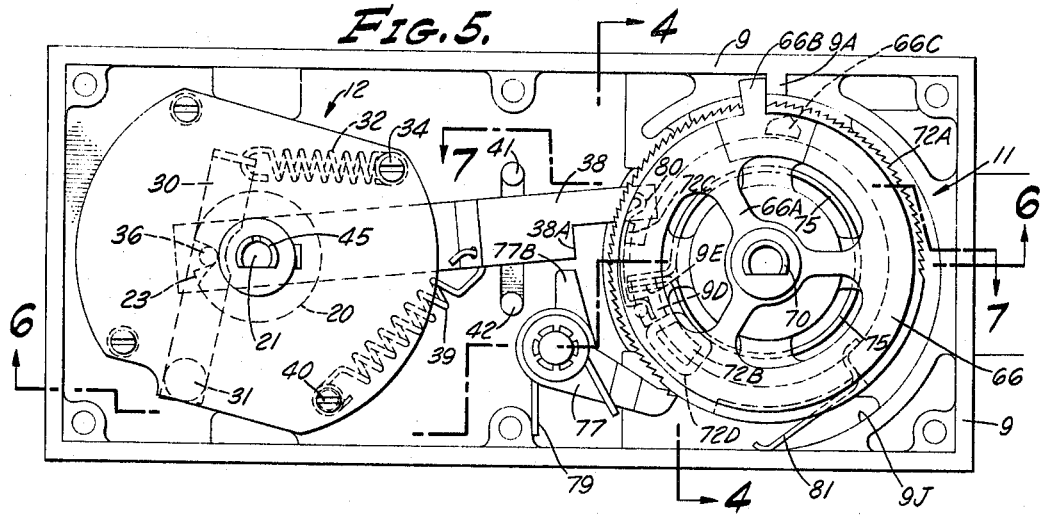
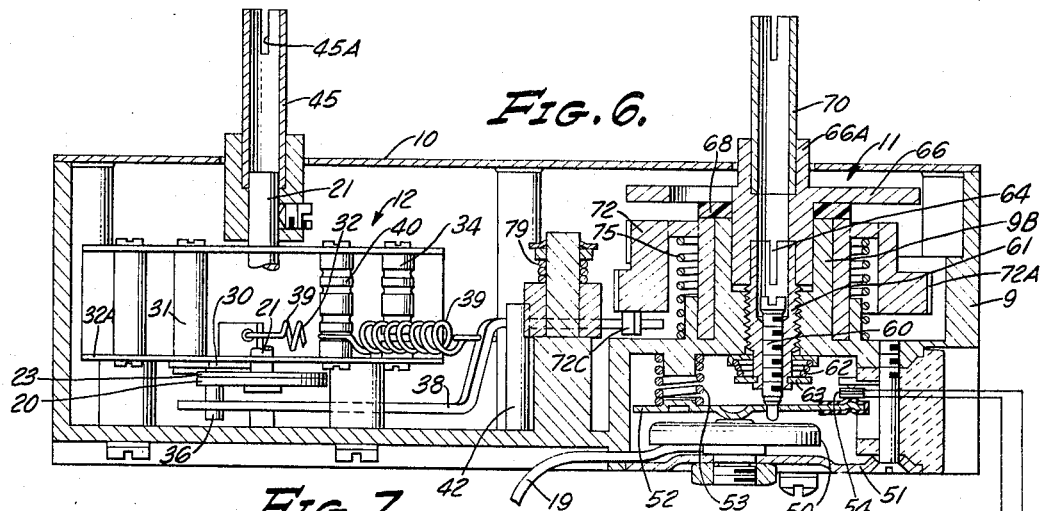
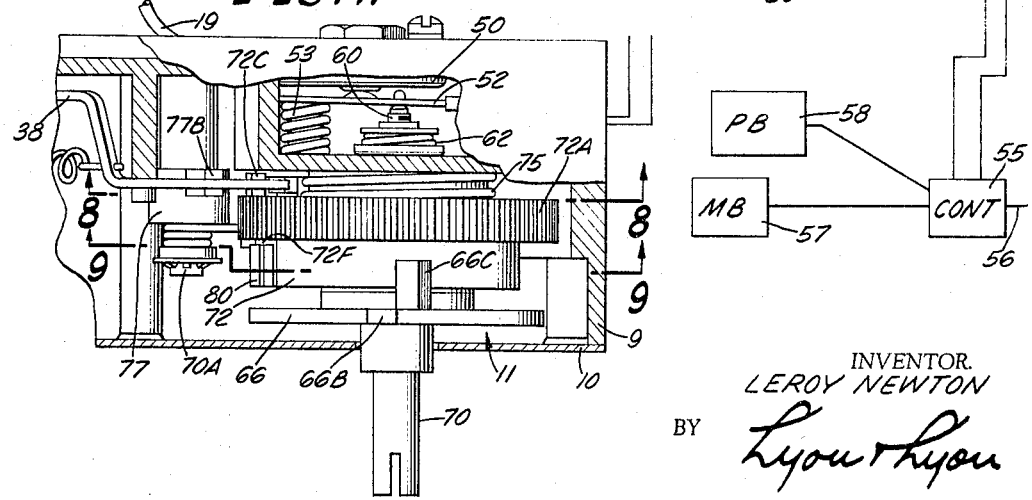
INVENTOR.
LEROY NEWTON
BY Lyon & Lyon
ATTORNEYS

Nov. 15, 1966  L. NEWTON  3,286,063
COMBINATION THERMOSTAT AND TIMER CONTROL
Filed March 2, 1964  3 Sheets-Sheet 3
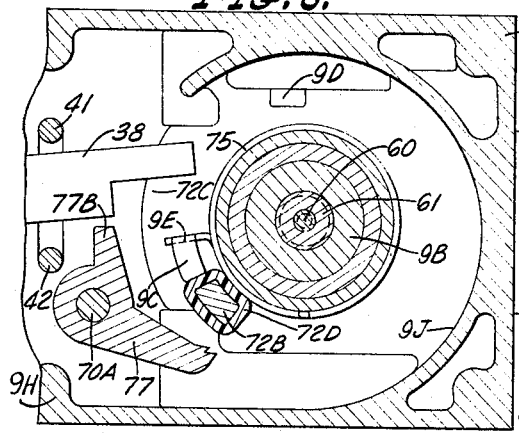
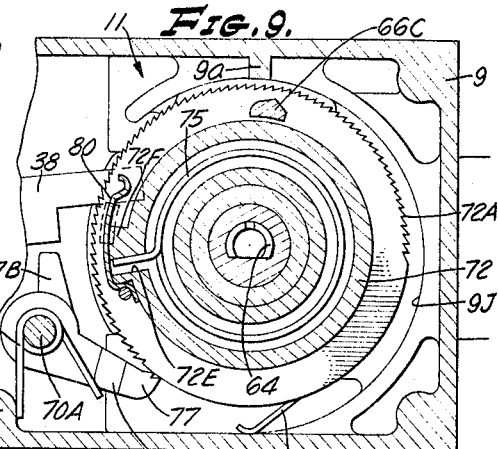
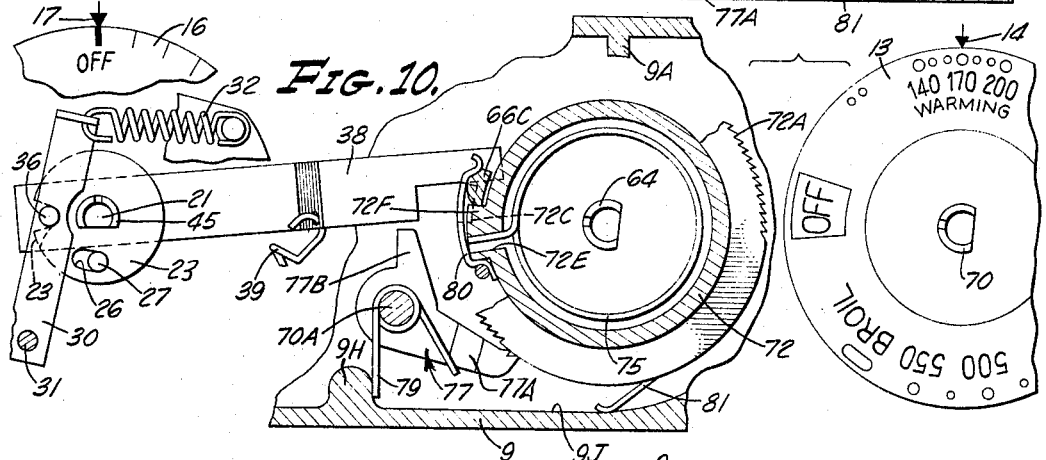
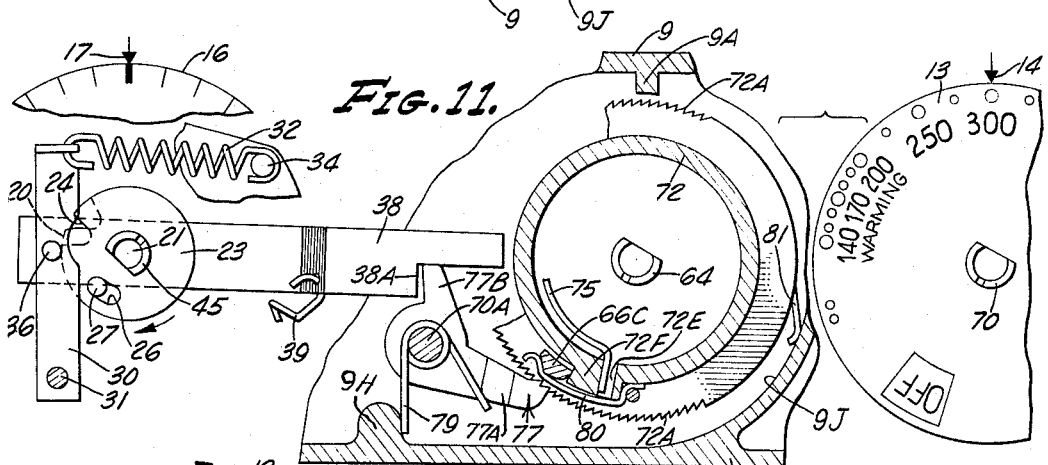
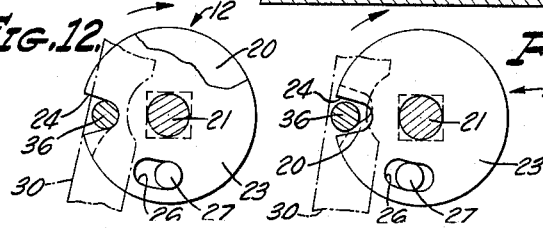
INVENTOR.
LEROY NEWTON
BY
Lyon & Lyon
ATTORNEYS United States Patent Office 3,286,063
Patented Nov. 15, 1966

3,286,063
COMBINATION THERMOSTAT AND TIMER
CONTROL
Leroy Newton, Burbank, Calif., assignor, by mesne assignments, to International Telephone and Telegraph Corporation, New York, N.Y., a corporation of Maryland
Filed Mar. 2, 1964, Ser. No. 348,507
7 Claims. (Cl. 200—136.3)

The present invention relates to means and techniques particularly useful in domestic oven controls and involves generally a mechanical connection between a manually adjustable temperature control and a manually adjustable timer for automatically adjusting the temperature control to a predetermined setting after the timer has timed itself out.

Briefly, as described herein, there is provided a manually settable thermostat and a manually settable mechanical timer. The thermostat is manually set to a cooking temperature and the timer is manually set at the number of hours to cook. In the process of manually setting the thermostat, energy is stored in a torsion spring wound when the thermostat is set. The thermostat includes a pawl and ratchet structure which serves to maintain the thermostat in a "cocked" condition with such energy stored therein. When the timer is set, energy is stored in a spring-loaded lever which is released at the end of the time cycle and the lever trips the previously mentioned pawl to release the energy stored in the torsion spring and causes the thermostat to be automatically set to a low temperature setting which in some cases may correspond to the "off" position of the thermostat. As illustrated herein, the thermostat is automatically set to a temperature setting of 170° F. which is considered a good "hold-warm" or serving temperature. At the end of such time cycle, the timer is in a returned or "off" position; to assure the maintenance of the thermostat at such holdwarm temperature, the lever is moved out of engagement with the pawl by an abutment movable with the thermostat dial so that the pawl is then again free to reengage the ratchet at the hold-warm temperature.

The device may be considered to be in a manual mode as long as the thermostat only is being operated and with the timer in its off position. It becomes time controlled simply by the setting of the timer, and completion of the time cycle automatically returns the device to the manual mode with a 170° F. setting of the thermostat. The device is usable for non-time control cooking since the previously mentioned torsion spring is wound with the first turning of the thermostat dial, and such spring remains wound until such a time that the pawl is released by the timer. The thermostat dial is free to be moved to any temperature setting regardless of the wound condition of such torsion spring. In all positions of the timer, the thermostat may be adjusted to any temperature including the off setting of the thermostat.

The arrangement described herein is considered in some respects to be an improvement over the arrangement described and claimed in copending application of Ralph E. Solomon, Serial No. 342,629, filed February 5, 1964, and assigned to the same assignee as the present application.

It is accordingly an object of the present invention to provide means and techniques for accomplishing the above indicated functions and results.

A specific object of the present invention is to provide an improved manually settable temperature control and a manually adjustable timer which are interlocked such that after an elapsed time the temperature control is automatically reset to a predetermined temperature.

Another specific object of the present invention is to provide an improved oven control in which cooking may be accomplished for a predetermined settable time at an elevated temperature, and after such predetermined time the oven is automatically controlled at a lower temperature.

Another specific object of the present invention is to provide an improved oven control of this character in which the energy for restoring the thermostat control to a predetermined setting is developed when the thermostat control is initially set.

Another specific object of the present invention is to provide specific unique mechanical construction for accomplishing these above indicated features, functions and results.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 5 is a sectional view taken generally as indicated by the lines 5—5 in FIG. 4.

FIGS. 6 and 7 are sectional views taken substantially as indicated by the lines 6—6 and 7—7, respectively, in FIG. 5.

FIGS. 8 and 9 are sectional views taken substantially as indicated by the corresponding lines 8—8 and 9—9 in FIG. 7.

FIG. 10 illustrates relationship of certain parts after the timer has timed itself out ad is in an off or manual (MAN) position and the thermostat control returned to a hold-warm or 170° F. temperature.

FIG. 11 illustrates parts shown in FIG. 10 in a different relationship wherein the timer has not yet timed itself out and the thermostat control is set at a cooking temperature.

FIGS. 12 and 13 illustrate different relationships of parts in the timer control and serve to illustrate generally the maner in which a pin is moved from its indexed position of FIG. 12 to the peripheral portion of a disc when and as the timer control is being adjusted from its off or manual position to a time position.

Figure 1:
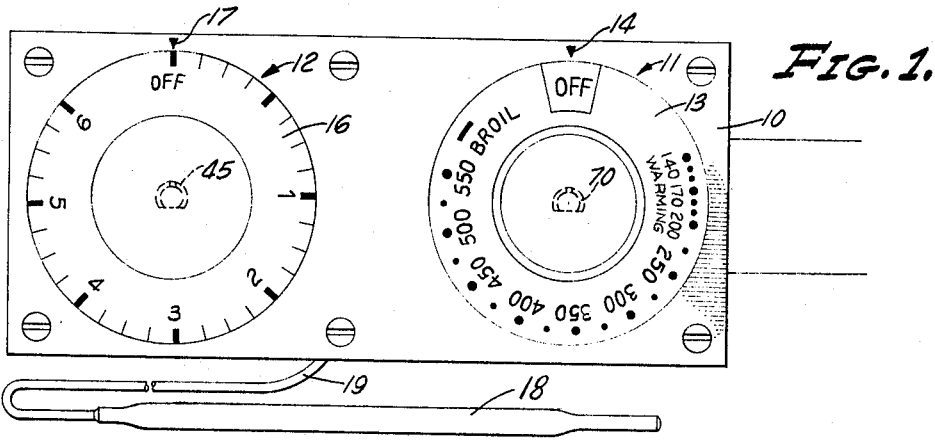
FIG. 1 illustrates a front view in elevation of a control embodying features of the present invention.

In FIG. 1, a casing 9 including a cover 10 therefor mounts a manually settable temperature control 11 and a manually settable timer control 12, the control 11 incorporating a knob 13 which include markings thereon including an off marking and temperature markings extending from 140° F. to broil, and such markings cooperate with a stationary indexing mark 14 on cover 10 for purposes of indicating the position of the knob 13 and hence the condition of the control. It is understood that the knob 13 is rotatable from its off position in a counterclockwise direction to a broil setting where means are incorporated for preventing further counterclockwise rotation of knob 13.

The timer control 12 incorporates a knob 16 cooperating with a stationary index mark 17 on the cover 10, and such dial 16 is rotatable in a counterclockwise direction from its off or manual (MAN) position to different time settings up to six hours as indicated by the numeral 6. Also, if desired, the dial 16 may have a marking "AUTO" thereon at approximately a one hour setting for indicating that the dial has been moved from its off or manual position.

Figure 2:
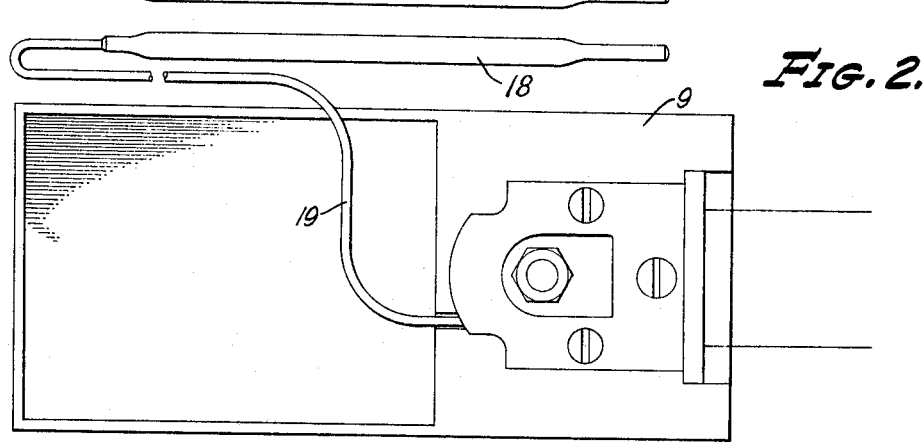
FIG. 2 illustrates a rear view of the control taken generally as indicated by the line 2—2 in FIG. 4.

As seen in FIG. 2, and also in FIG. 1, the control is connected through a flexible tubing 19 to a temperature sensing bulb 18 which is mounted in the oven being controlled, the bulb 18 and conduit 19 being filled with a temperature expansible fluid for purposes of actuating a switch from an on position to an off position upon attainment of a temperature set by knob 13, as described in more detail later.

By turning the knob 13, the operator may select any particular temperature, and this is so regardless of the condition of the timer knob 16; and also the operator by turning the knob 16 may select the number of hours during which cooking is accomplished at that temperature set by knob 13.

The timer 12 is a modified conventional mechanical timer which incorporates conventional means for progressively returning the knob 16 from an hour setting to its zero or manual setting. The timer control 12 is modified to include structure described later for automatically tripping a pawl member to automatically allow the temperature control 13 to set itself from a high temperature setting to the 170° F. or hold-warm temperature setting when and as the time control dial 16 reaches its zero or manual position.

Figures 3, 4:
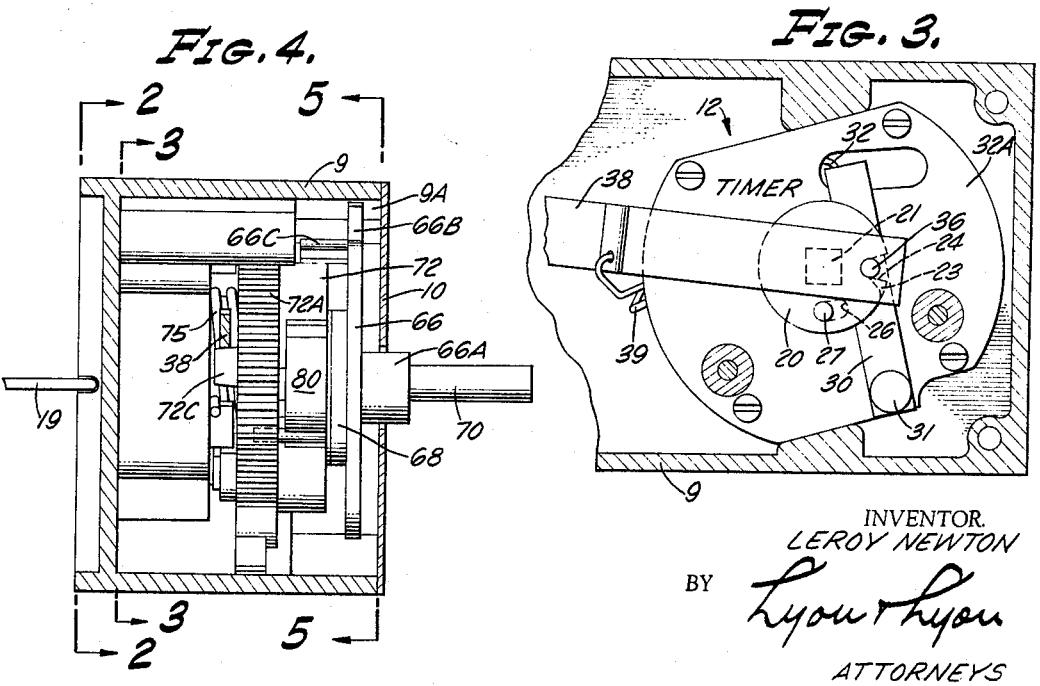
FIG. 3 is a sectional view taken generally as indicated by the line 3—3 in FIG. 4.
FIG. 4 is a sectional view taken generally as indicated by the line 4—4 in FIG. 5.

As seen in FIGS. 3, 12 and 13, the time control 12 has a cam disc 20 mounted on its shaft 21. The shaft 21 is the rotatable shaft of a conventional timer which is rotated by manual rotation of the timer knob 16 and which is progressively returned to a zero or manual position when and as the timer times itself out. A disc 23 having a V-shaped notch 24 is loosely mounted on the shaft 21 so that its movement with respect to the cam disc 20 is limited by the construction perhaps best seen in FIG. 12, wherein the disc 23 has a lost motion slot 26 into which a dimpled portion 27 of cam disc 20 extends. The diameter of disc 23 is slightly larger than the diameter of the disc 20.

A lever 30 has one of its ends pivotally mounted on a pin 31 which is secured to a stationary plate 32 of the conventional timer and the other end of lever 30 has attached thereto one end of a coil tension spring 32, the other end of spring 32 being attached to a stationary post 34 on plate 32A such that a pin 36 on an intermediate portion of lever 30 is constantly urged towards the disc 23. This pin 36 forms a pivot for a second lever 38 which is urged by a coil tension spring 39 having one of its ends attached to lever 38 and the other one of its ends attached to a stationary pin 40 on plate 32A. As seen in FIG. 5, this lever 38 extends between two spaced stationary abutments 41, 42 which may be used to limit movement of the lever 38. The end of this lever 38 is adapted to cooperate with elements of the thermostat control, as described later.

It is noted that the timer control 12, as seen in FIG. 6, includes an extension 45 for shaft 21 to which it is releasably secured and such shaft extension 45 includes a slotted portion 45A cooperating with a complementary lug (not shown) on the timer knob 16 (FIG. 1) whereby the knob may be properly indexed with respect to the timer mechanism in assembly of the knob or dial 16.

The temperature control or thermostat 11, as seen in FIG. 6, includes a conventional expansible element 50 secured to the base plate 51 of the control, such element 50 being in communication with the conduit 19 and being expanded in accordance with the temperature of the expansible fluid in the temperature sensing bulb 18 (FIG. 1). A lever 52 has an intermediate portion thereof fulcrumed on a movable portion of element 50 and has one of its ends urged by coil compression spring 53 having one of its ends seated on lever 52 and the other one of its end seated on an internal portion of housing 9. The other end of lever 52 is insulated for producing actuation of a switch 54 having its contacts connected to an electromagnetically controlled gas valve system 55 of conventional character for controlling the flow of gas from a gas inlet 56 to a main burner 57 of a domestic oven, the temperature of which is sensed by the previously mentioned bulb or probe 18 and controlled in accordance with operation of switch 54. Also, the gas control system as illustrated schematically includes a constantly burning pilot burner 58 supplied with gas from the inlet line 56 so that it is at all times ready to light the gas supplied to the main burner 57. Gas is supplied to main burner 57 when the switch 54 is closed which means that whenever the oven temperature reaches the temperature set by the thermostat control 11, the switch 54 is open to interrupt the flow of gas to the main burner 57. For purposes of adjusting the operating temperature of switch 54, the following construction is used: The lever 52 is apertured to receive the pointed end of an adjustable screw 60 which is threaded internally in an internally and externally threaded tubular element 61, the external threads of which engages a threaded portion 9B of an internal portion of casing 9 so that turning of the tubular element 61 results in adjustment of the operating temperature at which switch 54 is actuated. To frictionally maintain this adjustment, there is provided a small coil compression spring 62 having one of its ends seated against the housing 9 and the other one of its ends seated against a washer 63 on the adjustment element 61. This tubular adjustment element 61 is provided with an indexing notched portion 64 which cooperates with a complementary mating internal portion of the hub portion 66A of an apertured turnable disc 66.

This disc 66, as seen in FIG. 5, has an outwardly radially extending portion 66B which is engageable with an inwardly extending portion 9A of casing 9 in the off position of the thermostat control, as shown in FIG. 5. Also, this disc 66 has, as indicated in FIG. 5, an axially extending projection 66C used for storing energy in a torsion spring, as described later. Indexed within the hub portion 66A is the shaft 70 on which the thermostat knob 13 (FIG. 1) is indexably mounted so that turning of such knob 13 with its shaft 70 results in turning of the disc 66 and the tubular threaded element 61 within the internal housing portion to adjustably space the switch actuating end of lever 52 from the switch 54.

This portion 9B of casing 9 in which the tubular element 61 is threaded is formed as a hub for rotatably supporting a torsion spring housing 72 which has ratchet teeth 72A formed on an enlarged peripheral portion thereof. Also, the torsion spring housing 72 is formed with two downwardly extending lugs 72B and 72C (FIG. 8 and FIG. 4), the lug 72B being covered with a resilient material 72D which is contactable with two spaced stationary stop members or lugs 9C, 9D formed on casing 9 for limiting rotational movement of the torsion spring housing 72. The other lug 72C which is radially spaced so as not to contact the stationary lug 9C is used to engage one end of the timer lever 38 for purposes described later.

The torsion spring 75 within housing 72 has its lower end maintained stationary, as seen in FIG. 8, by engagement of a bent end of the spring engaging an undercut portion 9E of abutment 9C, the other or upper end of spring 75 being bent as shown in FIG. 9 and being retained within a grooved portion 72E, such grooved portion 72E extending radially into a radially extending projection or lug 72F of housing 72. This lug 72F is contactable by the previously mentioned disc lug 66C so that continued counterclockwise rotation of the lug 66C in FIG. 9 after engagement with the lug 72F results in torsion spring 75 becoming increasingly tensioned since the housing 72 is moved then by the lug 66C.

During such rotation of the housing 72, the teeth 72A thereon ride over a spring urged cooperating pawl member 77 which is pivotally mounted on a pin 70A on casing 9 and which is constantly urged toward said toothed portion 72A by a small torsion spring 79 on post 78, the spring 79 having one of its ends engaging a portion 9H of casing 9 with the other end of spring 79 being in engagement with a lug 77A on the pawl member. This pawl member 77 is formed with an integrally extending arm portion 77B engageable with the timer lever 38, as described later, for disengaging the pawl 77 from the toothed portion 72A. It is noted also in FIG. 9 that a small leaf spring 80 is mounted on the torsion spring housing 72 to resiliently engage the disc lug 66C when the same contacts the lug 72F (FIG. 10) to thereby provide a releasable connection between the same.

Also mounted on the somewhat cylindrical or drum-shaped housing 72 is a second leaf spring 81 having its free end contacting an inner wall portion 9J of casing 9 to provide a frictional connection between the torsion spring housing 72 and the casing 9, it being noted that the wall portion is progressively spaced from the cylindrical housing 72 such that when the housing 72 is turned counterclockwise in FIG. 9, the leaf spring 81 becomes increasingly stressed to provide an increased friction force between the housing 72 and the wall portion 9J to make the return movement of the housing 72 (when the pawl 77 is released) more uniform, i.e., as the spring 75 is allowed to unwind and produce clockwise movement of the housing 72 in FIG. 9, its resistance to movement progressively decreases.

In the following description of the operation of the control it is initially assumed that the timer knob 16 is in its manual position and the thermostat knob 13 is in its off position, and in such case the conditions illustrated in FIG. 5 prevail. In such case, the lug 66B on the disc 66 connected to the temperature dial 13 engages the casing stop 9A and the pin 36 is within the V-shaped notch portion 24 (FIGS. 5 and 12) of the disc 23 loosely mounted on the timer shaft 21. The right-hand end of lever 38 (FIGS. 5 and 8) is in a raised position out of engagement with the pawl 77 due to the engagement of such lever end 38 with the lug 72C on the torsion spring housing 72, such housing 72 at this time having its resiliently covered lug 72B in engagement with the casing stop 9C. Then, turning of the thermostat 13 in a counterclockwise direction to a hold-warm temperature setting of 170° F., as illustrated in FIG. 10, results in the disc lug 66C connected to such dial 13 to engage the housing lug 72F and be resiliently retained in such position by the leaf spring 80. The lever arm 38 remains in its raised position since this movement of the temperature dial 13 has thus far not resulted in movement of the torsion spring housing 72. Then, still further counterclockwise rotation of the timer knob 13 with the disc lug 66 connected thereto requires a greater amount of torque which is required in further tensioning of the prestressed torsion spring 75. Thus, the spring 75 is wound tighter when and as the thermostat dial is moved from its 170° F. setting to a higher setting. Upon release of the thermostat knob, it remains in its highest temperature setting, the spring 75 being prevented from returning the knob to the 170° F. setting because of the one-way connection provided by the pawl 77 engaging the ratchet teeth 72A on the torsion spring housing 72. It is noted, however, at this point that the thermostat knob may be returned from such setting to any lower temperature setting, including also the off position of the knob without effecting return movement of the spring housing 72 which under this particular condition remains in a locked condition by pawl 77.

Thus, assuming that the knob of the thermostat control has been set to its 300° F. setting, as indicated in FIG. 11, subsequent operation of the timer knob 16 to an hour setting results in the conditions illustrated in FIGS. 11, 12 and 13. In such case, rotation of the timer shaft 21 by knob 16 causes the pin 36 to be cammed out of the V-shaped notch portion 24 of disc 23 and such pin 36 then rides on the outer periphery of the slightly larger disc 23 loosely connected to shaft 21 causing the shoulder portion 38A of lever 38 to be moved to the left in FIGS. 10 and 11 adjacent to the pawl arm 77B. With the timer thus set, cooking is accomplished at the 300° F. temperature until the timer has automatically timed itself out in which case the disc 20 has been automatically and progressively rotated in a counterclockwise direction in FIG. 11, and the pin 36 has returned into the V-shaped notch portion 24 to allow the spring 32 to move the lever 38 to the right in FIG. 11 and rotate the pawl 77 out of engagement with the toothed portion 72A. Upon such disengagement, the energy stored in spring 75 is used to automatically rotate the torsion spring housing 72 and the disc lug 66C resiliently connected thereto by leaf spring 80 in a clockwise direction in FIG. 11 to thereby allow such spring 75 to return the thermostat dial towards its 170° F. position. When and as such 170° F. position is being approached, the lug 72C on housing 72, as seen in FIG. 8, contacts the lever 38 and raises it out of engagement with the pawl arm 77B thereby allowing the spring 79 to again effect an engagement between the pawl 77 and the toothed portion 72A. Such engagement occurs at the 170° F. or hold-warm setting. Thus, even though the timer has timed itself out and returned to its manual position, the oven is still being heated at the hold-warm temperature. This hold-warm temperature is maintained indefinitely until the operator moves the thermostat dial to its off position in which case the operator must provide a sufficient torque to overcome the holding action of the leaf spring 80 on the disc lug 66C.

It will be seen that the operator may at any time return the thermostat control to its off position regardless of whether or not the timer has been set for an hour position, or whether the timer is in its manual or off position. Thus, should the timer have been set and it is desired to turn off the temperature, this is simply accomplished by rotating the thermostat knob to its off position applying sufficient torque to overcome the holding action of the leaf spring 80 on the disc lug 66C connected to such dial or knob; and in such case, the timer automatically times itself out returning to its manual or off position without affecting the off setting of the thermostat. However, during such timing out of the timer, the pawl 77 is again released, as described above, to allow the torsion spring housing 72 to return to its position shown in FIG. 8. So-called manual or non-timed cooking may be accomplished, as indicated above, in the non-set condition of the timer simply by rotating the thermostat knob and disc lug 66C connected thereto to the desired cooking temperature.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A combination thermostat and timer control comprising a casing; a thermostatically controlled switch mounted on said casing; a disc rotatably mounted in said casing and connected to means for adjusting the operating point of said switch upon rotation of the disc; a somewhat drum-shaped housing rotably mounted on a hub portion of said disc; ratchet teeth on the periphery of said housing; a torsion spring mounted within said housing having one end fixed to said casing and its other end fixed to said housing; means formed on said disc for engaging a portion of said housing after said disc is rotated from an "off" position wherein said switch is open to a "warming" position wherein said switch is set to maintan a predetermined low temperature setting, further rotation of said disc to a temperature setting higher than said warming position causing said engagement means on said disc to rotate said housing thereby stressing said spring to store energy therein; a pawl mounted in said casing engageable with said teeth to maintain the energy stored in said spring; and timer controlled means for releasing said pawl to allow said stored energy to rotate said housing thereby causing said housing portions to act on said engaging means on said disc to rotate said disc to said warming position.

2. The invention of claim 1 in which said engaging means on said disc comprises an axially extending projection; and the portion of said casing engaged by said projection comprises a radially extending lug, said projection being arcuately spaced from said lug when said disc is in said off position.

3. The invention of claim 1 including means for releasably connecting said disc engaging means and said housing portion.

4. The invention of claim 2 including circumferentially extending spring means attached to said lug for releasably connecting said projection and said lug so that said disc and said housing are rotatable as a unit when said lug and projection are connected by said spring means and yet said disc may be manually rotated at any time to release said projection from said spring connecting means.

5. The invention of claim 1 in which said timer controlled means includes a pivoted lever having an end engageable with said pawl to release it; and a projection on said casing engageable with said lever end to disengage said lever from said pawl when said timer means is in a "timed out" condition.

6. The invention of claim 1 in which said timer controlled means includes a pivoted lever having an end engageable with said pawl to releae it, said lever being operated by a timer which has an automatically returnable shaft with a cam depression therein; a second lever having one of its ends pivoted on said casing and carrying a pin; first spring means urging said pin towards same cam depression, the first mentioned lever being pivoted on said pin; and second spring means urging the first mentioned lever towards said pawl.

7. The invention of claim 1 including friction means for limiting the speed of return movement of said housing, said friction means becoming less effective as said housing is being returned.

References Cited by the Examiner

UNITED STATES PATENTS

| 2,545,846 | 3/1951 | Dunn | 236—46 |
| 3,172,978 | 3/1965 | Taffet | 200—122 X |
| 3,172,998 | 3/1965 | Ferguson. | |

FOREIGN PATENTS 846,484   8/1960   Great Britain.

BERNARD A. GILHEANY, *Primary Examiner.*

L. A. WRIGHT, *Assistant Examiner.*